United States Patent [19]

Thigpen et al.

[11] 4,317,185
[45] Feb. 23, 1982

[54] STREAMER CABLE TOWING LINK

[75] Inventors: Ben B. Thigpen, Houston; Richard Schiffman, Friendswood, both of Tex.

[73] Assignee: Western Geophysical Co. of America, Houston, Tex.

[21] Appl. No.: 156,968

[22] Filed: Jun. 6, 1980

[51] Int. Cl.³ .............................................. G01V 1/38
[52] U.S. Cl. .................................... 367/15; 367/130; 174/101.5; 114/242; 114/247; 114/253; 339/104
[58] Field of Search .................................... 367/15–18, 367/20, 129, 130; 174/101.5; 114/242, 243, 244, 246, 249, 247, 253, 254; 339/104, 105

[56] References Cited
U.S. PATENT DOCUMENTS

| 3,034,468 | 5/1962 | Aschinger | 114/244 |
|---|---|---|---|
| 3,648,226 | 3/1972 | Fitzpatrick | 114/253 |
| 4,180,103 | 12/1979 | Mollere | 367/20 |
| 4,204,188 | 5/1980 | Weichart et al. | 174/101.5 |

Primary Examiner—Howard A. Birmiel
Attorney, Agent, or Firm—William A. Knox

[57] ABSTRACT

A towing link consists of spaced-apart head and tailpieces. The headpiece includes a towing eye and a pair of lugs for receiving the stress members of a streamer and a lead-in cable. The tailpiece defines a pair of bores through which the stress member and electrical conductors of the two cables are inserted and sealed. A pair of mating connector plugs are provided to interconnect corresponding conductors of the two cables. The assembly is enclosed in a watertight plastic boot.

5 Claims, 3 Drawing Figures

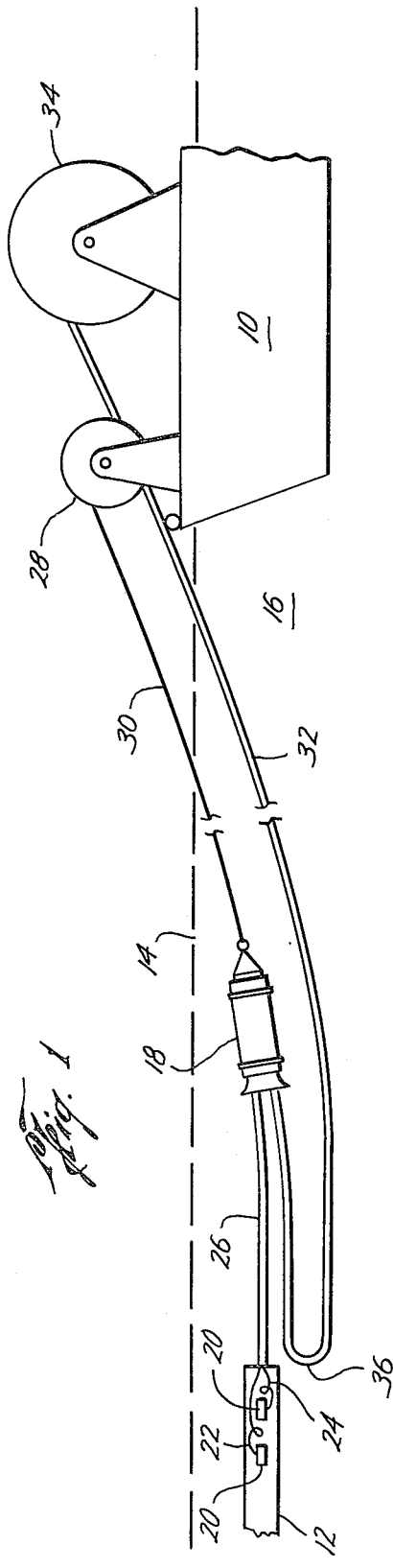
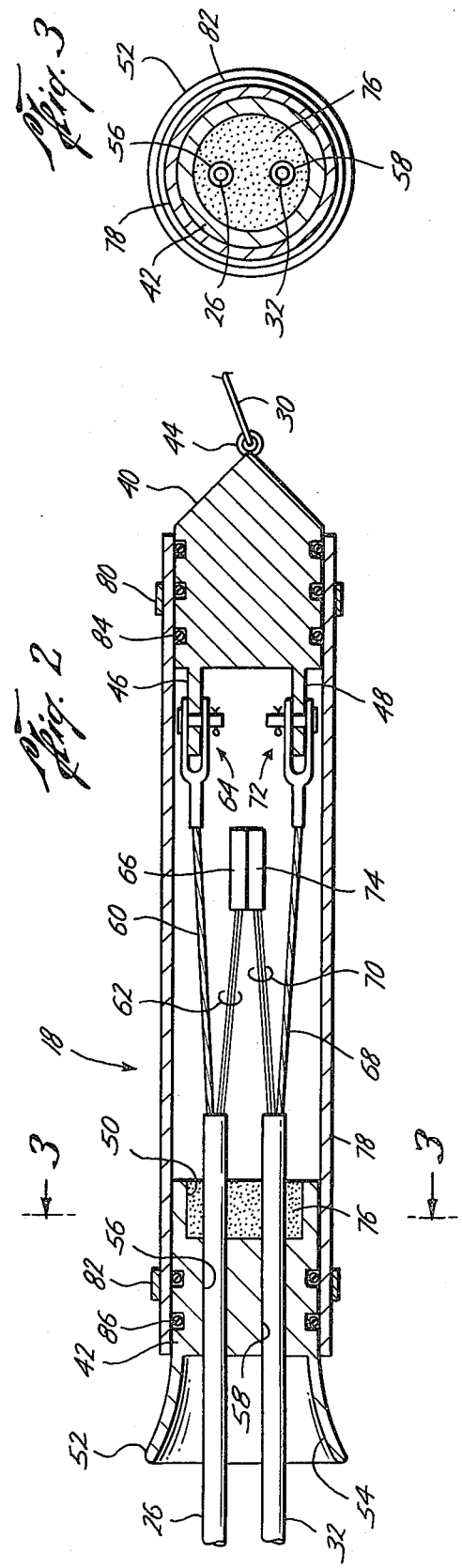

STREAMER CABLE TOWING LINK

BACKGROUND OF THE INVENTION

1. Technical Field of the Invention

The subject matter of this invention finds use in intermittent towing operations by seismic recording ships working in shallow water and as an attaching means for decoupling the cable mechanically from the vessel's motion.

2. Discussion of the Prior Art

In marine seismic surveying, a ship tows a streamer cable through the water along a line of survey. The streamer cable contains a plurality of seismic sensors. A corresponding plurality of conductor pairs are included in the streamer cable to electrically interconnect the sensors with signal processing equipment aboard the ship. At specified recording stations along the survey line, a seismic sound source is fired. The resulting acoustic pulse travels downwardly through the water and through the rock layers therebeneath. At each rock-layer interface some of the acoustic energy is reflected back to the surface of the water where the reflected energy is detected by the sensors.

The streamer cable is connected to the ship by a lead-in cable. Whereas the streamer cable is neutrally bouyant and includes sensors, electrical conductors and stress members, the lead-in cable includes only a single, heavy stress member and the electrical conductors. Usually, the lead-in cable is several hundred feet long.

In deep water, the streamer cable is towed continuously through the water at constant speed. Pressure-actuated diving modules hold the cable at a constant desired depth in the range of 20–40 feet. Since no appendages are attached to the streamer cable there is very little towing noise.

In shallow water, it is impractical to maintain the streamer cable at a constant depth by means of automatic diving modules. Accordingly, the streamer cable is suspended from surface bouys by suspension lines. Alternatively, the bouyancy of the cable may be increased and weights may be attached thereto to hold the cable a fixed distance from the bottom; three or four feet above the bottom is common. When towed through the water the attached bouys and suspension lines create considerable towing noise. Accordingly, at each recording station, the streamer cable must be brought to a standstill. It is impractical to stop the ship at each recording station. Therefore an intermittent towing mode is used as described in a copending application Ser. No. 162,865 entitled Marine Seismic Cable Handler, Filed June 25, 1980 and assigned to the assignee of this invention. A similar system is described in U.S. Pat. No. 3,286,225 to Huckabay et al.

For intermittent towing, a yo-yo reel is provided, that is separate from the usual cable-storage reel. A separate tether line is secured to the streamer cable and is reeled in by the yo-yo reel. At a recording station, the reel is released so that the tether line unreels and allows the streamer cable to drift to a stop behind the ship as the ship moves forward at constant speed. After data have been recorded, the tether line is reeled in again in anticipation of the next recording station.

Since the lead-in cable is several hundred feet long and since the tether need by only between 100 and 200 feet long, the tether line is attached to the lead-in cable by a suitable saddle clamp. When the tether line is reeled in, the excess lead-in cable is doubled back on itself at the saddle clamp. Each time that the tether line is payed out, unavoidably the lead-in cable flexes sharply at the saddle clamp. After a period of time, the electrical conductors work-harden and break. Repair of the lead-in cable is laborious and expensive.

SUMMARY OF THE INVENTION

The object of this invention is to provide a towing link for attaching a tether line to a lead-in cable that will prevent sharp flexing of the lead-in cable.

In a preferred embodiment of this invention, the towing link includes a headpiece and a tailpiece in spaced-apart relationship. The leading face of the handpiece includes a towing eye and the trailing face includes a pair of lugs. The tailpiece defines a pair of bores with a cup-shaped depression on the leading face and a flared skirt on the trailing face. The stress member and conductors from the streamer cable or from a portion of the lead-in cable are sealed in one of the bores of the tailpiece and the stress member is detachably secured to a lug of the headpiece. The stress member of the lead-in cable is sealed in the other bore and its stress member is detachably secured to the other lug of the headpiece. A pair of mating connector plugs, positioned between the head and tailpieces provide for connecting the streamer cable conductors to the lead-in cable conductors. An elongated flexible plastic boot encloses the conductors and connector plugs and is clamped around the head and tailpieces.

BRIEF DESCRIPTION OF THE DRAWINGS

FIG. 1 shows a ship towing a seismic streamer cable using the towing link of this invention.

FIG. 2 illustrates the details of construction of the towing link.

FIG. 3 is a cross section through 3—3' of FIG. 2.

DETAILED DESCRIPTION OF THE PREFERRED EMBODIMENT

In FIG. 1 there is shown a ship 10 towing a seismic streamer cable 12 beneath the surface 14 of a body of water 16, through towing link 18. Streamer cable 12 includes a plurality of seismic sensors such as 20 and a corresponding plurality of conductor pairs such as 22 and 24 to transmit seismic signals to a data-recording system (not shown) aboard ship 10. The electrical conductors and a stress member are contained within a streamer-cable termination link 26 which is secured to towing link 18 in a manner to be described infra. Towing link 18 is secured to yo-yo reel 28 by tether cable 30 which may be a half-inch stainless steel cable. Slack-line lead-in cable 32 has one end secured to towing link 18 and the other end secured to storage reel 34. Lead-in cable 32 includes a stess member and a plurality of electrical conductor pairs for transmitting seismic signals from the seismic sensors to a recorder.

In operation, yo-yo reel 28 reels in tether cable 30 to draw streamer cable 12 towards ship 10. In so doing, lead-in cable 32 doubles back upon itself to form a loop 36 behind towing link 18. When ship 10 occupies a recording station, reel 28 is placed in a free-wheeling mode to allow tether line to be payed out as the ship moves forward to the right. Loop 36 of course, becomes shorter as streamer cable comes to a standstill in the water. Normally, about 100 feet or less of tether line 30 is payed out during the course of a data recording period. Loop 36 has a design length such that when tether line 30 is fully payed out, there will remain a substantial amount of excess slack in lead-in cable 32. The excess slack allows lead-in cable 32 to always trail behind towing link 18, thereby preventing sharp bends in the cable.

Referring now to FIGS. 2 and 3, there is shown the details of construction of towing link 18. Towing link 18 consists of a headpiece 40, spaced apart from a tailpiece 42. The leading surface of headpiece 40 has a towing eye 44 welded thereto. The trailing surface includes a pair of lugs 46, 48.

Tail piece 42 includes a leading end defining a cup 50 and a trailing end defining a flared skirt 52 having an exponentially curved inner surface 54. The flared, curved skirt prevents sharp bending of the cables 26 and 32. Tail piece 42 also includes a pair of bores 56 and 58.

Termination link 26 is passed through bore 56 after which stress member 60 is separated from conductor pairs 62. Stress member 60 is secured to lug 46 by any convenient means such as a pin-and-clevis type fixture 64. Conductors 62 are terminated in a female connector plug 66. Similarly, lead-in cable 32 is passed through bore 58 and stress member 68 is separated from conductors 70. Stress member 68 is anchored to lug 48 by pin-and-clevis fixture 72. Conductors 70 are terminated in a male plug 74 which mates with female plug 66. After termination cable 26 and lead-in cable 32 have been inserted into bores 56 and 58, cup 50 is filled with a sealing compound 76 such as epoxy cement to watertightly seal the cables in place.

An elongated plastic boot 78 is slipped over headpiece 40 and tail piece 42. The boot may be made of heavy-walled polyurethane or polyvinylchloride tubing. The boot is held in place by two or more suitable steel clamping bands 80 and 82. Serrations such as 84 and 86 provide a toothed gripping surface to help hold boot 78 securely in place when clamps 80 and 82 are tightened. Boot 78 prevents water invasion of the volume between head and tailpieces 40 and 42. If desired, the volume inside the boot may be filled with a bouyant insulating liquid to further guard against water invasion.

Our invention has been disclosed in an exemplary embodiment which may readily be modified by those skilled in the art without departing from the spirit and scope of the invention which is limited only by the appended claims.

We claim:

1. A towing link for a seismic streamer cable coupled to a terminator link, there being contained in said streamer cable a plurality of seismic sensors, a plurality of electrical conductors for transmitting signals from said sensors and at least one stress member, comprising:
   a headpiece for connection to a tow line including lugs;
   a tailpiece defining two bores, spaced apart from said headpiece;
   a slack-line lead-in cable including a plurality of electrical conductors and a stress member;
   means for sealingly anchoring the conductors and stress member of the terminator link through one of the bores of said tailpiece and means for sealingly anchoring an end of the lead-in cable through the other bore;
   means for releasably securing the stress members of said terminator link and of said lead-in cable to the lugs of said headpiece;
   means, positioned between said head and tailpieces, for releasably connecting the conductors of the terminator link with corresponding conductors of the lead-in cable; and
   means for watertightly enclosing said connecting means.

2. The towing link as defined in claim 1 wherein said headpiece includes:
   a leading end and a trailing end, the said lugs forming part of the trailing end and a towing eye forming part of the leading end.

3. The towing link as defined in claim 2 wherein said tailpiece includes:
   a leading end defining a cup for containing a sealant.

4. The towing link as defined in claim 3 wherein said tailpiece further includes:
   a trailing end defining a flared skirt having an exponentially curved inner surface.

5. The towing link as defined in claim 4 wherein:
   the watertight enclosing means is an elongated flexible plastic boot for enclosing said connection means, the boot being clamped around the spaced-apart head and tailpieces and containing an electrically insulating fluid.

* * * * *